(12) United States Patent
Eidmann et al.

(10) Patent No.: US 12,177,208 B2
(45) Date of Patent: Dec. 24, 2024

(54) TRANSMISSION OF SECURITY SETTINGS BETWEEN A FIRST AND A SECOND AUTOMATION ENGINEERING FIELD DEVICE

(71) Applicant: Endress+Hauser Process Solutions AG, Reinach (CH)

(72) Inventors: Axel Eidmann, Lörrach (DE); Benedikt Spielmann, Basel (CH); Simon Merklin, Bahlingen (DE); Thomas Alber, Stuttgart (DE); Axel Pöschmann, Basel (CH)

(73) Assignee: Endress+Hauser Process Solutions AG, Reinach (CH)

( * ) Notice: Subject to any disclaimer, the term of this patent is extended or adjusted under 35 U.S.C. 154(b) by 288 days.

(21) Appl. No.: 17/757,566

(22) PCT Filed: Dec. 1, 2020

(86) PCT No.: PCT/EP2020/084086
§ 371 (c)(1),
(2) Date: Jun. 17, 2022

(87) PCT Pub. No.: WO2021/121962
PCT Pub. Date: Jun. 24, 2021

(65) Prior Publication Data
US 2023/0015870 A1    Jan. 19, 2023

(30) Foreign Application Priority Data
Dec. 19, 2019 (DE) ................. 10 2019 135 268.1

(51) Int. Cl.
*H04L 9/40* (2022.01)

(52) U.S. Cl.
CPC ........ *H04L 63/083* (2013.01); *H04L 63/0442* (2013.01); *H04L 63/101* (2013.01); *H04L 63/104* (2013.01)

(58) Field of Classification Search
CPC . H04L 63/083; H04L 63/0442; H04L 63/101; H04L 63/104; H04L 63/0428;
(Continued)

(56) References Cited

U.S. PATENT DOCUMENTS 9,602,279 B1    3/2017 Tran et al.
10,313,342 B1 * 6/2019 Caldwell ............... H04L 63/102
(Continued)

FOREIGN PATENT DOCUMENTS

CN    1592191 A    3/2005
CN    105956496 A    9/2016
(Continued)

*Primary Examiner* — Bruce S Ashley
(74) *Attorney, Agent, or Firm* — Brannon Sowers & Cracraft PC

(57) ABSTRACT

A method for transmitting security settings between a first automation engineering field device and a second automation engineering field device includes: identifying and authenticating an operator by means of a service unit; assigning an authorization group based on the identifying and authenticating of the operator; in the case, in which the operator is assigned the administrator authorization group: encrypting at least one security setting, which is present in cleartext, by the first field device; exporting the encrypted security setting; importing the encrypted security setting into the second field device; decrypting the encrypted security setting; loading the decrypted security setting into the data memory of the second field device and operating the second field device with the loaded security setting of the first field device.

13 Claims, 1 Drawing Sheet

(58) Field of Classification Search
CPC ....... H04L 63/08; H04L 63/105; H04L 63/20; Y02P 90/02
See application file for complete search history.

(56) References Cited

U.S. PATENT DOCUMENTS

| | | | |
|---|---|---|---|
| 2003/0074566 A1* | 4/2003 | Hypponen | G06F 21/31 713/183 |
| 2011/0202975 A1 | 8/2011 | Maximilien et al. | |
| 2012/0198344 A1 | 8/2012 | Tukol et al. | |
| 2013/0086646 A1 | 4/2013 | Poschmann | |
| 2016/0212103 A1* | 7/2016 | Rhoads | H04L 63/0869 |
| 2019/0303561 A1* | 10/2019 | Humble | H04L 63/123 |

FOREIGN PATENT DOCUMENTS

| | | | | |
|---|---|---|---|---|
| CN | 108696500 | A | 10/2018 | |
| CN | 110460581 | A | 11/2019 | |
| DE | 102014112611 | A1 | 3/2016 | |
| DE | 102016107045 | A1 | 10/2017 | |
| DE | 102017127903 | A1 | 5/2019 | |
| GB | 2403042 | A | 12/2004 | |
| WO | WO-2013131694 | A1 * | 9/2013 | ............. G06F 21/31 |

\* cited by examiner

TRANSMISSION OF SECURITY SETTINGS BETWEEN A FIRST AND A SECOND AUTOMATION ENGINEERING FIELD DEVICE

CROSS-REFERENCE TO RELATED APPLICATIONS

The present application is related to and claims the priority benefit of DPMA Patent Application No. 10 2019 135 268.1 filed on Dec. 19, 2019, and International Patent Application No. PCT/EP2020/084086, filed Dec. 1, 2020, the entire contents of which are incorporated herein by reference.

TECHNICAL FIELD

The invention relates to a method for transmitting security settings between a first automation engineering field device and a second automation engineering field device, wherein the first field device and the second field device each have at least one data memory, in which security settings are stored, wherein the security settings include at least one operator role management means having a plurality of authorization groups, wherein an authorization group allows an operator to access at least one operational functionality and/or data record of the field device, wherein the authorization groups differ in number and form of the operational functionalities defined in the operator roles, wherein an administrator authorization group is provided, which allows access to the security settings of the field device. Furthermore, the invention relates to a field device and to a service unit, each of which is embodied for use in the method of the invention.

BACKGROUND

Known from the state of the art are field devices, which are used in industrial plants. Field devices are often applied In process automation technology, as well as in manufacturing automation technology. Referred to as field devices are, in principle, all devices, which are applied near to a process and which deliver, or process, process relevant information. Field devices are used for registering and/or influencing process variables. Serving for registering process variables are measuring devices, or sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a tube or pipe or the fill level in a container. Besides the above mentioned measuring devices and actuators, referred to as field devices are also remote I/Os, radio adapters, and, in general, devices, which are arranged at the field level.

A large number of such field devices are produced and sold by the Endress+Hauser group of companies.

In modern industrial plants, field devices are, as a rule, connected with superordinated units via communication networks, such as, for example, fieldbusses (Profibus®, Foundation® Fieldbus, HART®, etc.). Normally, the superordinated units are control systems, or control units, such as, for example, a PLC (programmable logic controller). The superordinated units serve, among other things, for process control, process visualizing, process monitoring as well as for commissioning of field devices. The measured values registered by field devices, especially by their sensors, are transmitted via the given bus system to one or more superordinated units. In addition, also a data transmission from the superordinated unit over the bus system to the field devices is required, especially for configuration and parametering of field devices as well as for operation of actuators.

For servicing the field devices, corresponding operating programs (operating tools) are necessary, which either run independently (Endress+Hauser FieldCare, Pactware, AMS Fisher-Rosemount, PDM Siemens) or are incorporated in control system applications (Siemens PCS7, ABB Symphony, Emerson Delta V) in the superordinated units. Likewise, it is possible to execute the operating programs in a mobile servicing device, in order to service the field devices in this way.

Present in a field device are a large number of application specific and user specific data. Such includes, for example, configuration, or parametering, data, which define the operating behavior, especially the measuring behavior, of the field device. Also present are log files, or log data, which, for example, retain and make traceable operator changes to the configuration, or the parametering, data.

Furthermore, a field device has security settings. These comprise mainly various operator accounts, which possess different authorization groups. The authorization groups define which actions an operator is permitted to execute in a field device, and which actions are blocked.

While process-related data, or the parametering, of a field device can be currently transmitted to another device, such is currently not permitted for the security settings. Today, at each individual field device, operator accounts must be manually installed, authorization groups defined, and the authorization groups assigned to individual operator accounts. This represents a not insignificant amount of work and time consumed. Furthermore, security settings involve sensitive data, which, for safety reasons, must not be created, or changed, by just anybody.

SUMMARY

An object of the invention is to provide a safe transfer of security settings between field devices of automation technology.

As regards the method, it is provided that the method serves for transmitting security settings between a first automation engineering field device and a second automation engineering field device, wherein the first field device and the second field device each have at least one data memory, in which security settings are stored, wherein the security settings include at least one operator role management means having a plurality of authorization groups, wherein an authorization group allows an operator to access at least one operational functionality and/or data record of the field device, wherein the authorization groups differ in number and form of the operational functionalities defined in the operator roles, wherein an administrator authorization group is provided, which allows access to the security settings of the first field device, wherein the method comprises steps as follows:
  a. identifying and authenticating an operator by means of a service unit,
  b. assigning an authorization group based on the step of identifying and authenticating the operator;
  c. in the case, in which the operator is assigned the administrator authorization group:

i. encrypting at least one security setting, which is present in cleartext, by the first field device;
ii. exporting the encrypted security setting;
iii. importing the encrypted security setting into the second field device;
iv. decrypting the encrypted security setting;
v. loading the decrypted security setting into the data memory of the second field device and operating the second field device with the loaded security setting of the first field device.

The method of the invention allows transmission of at least one part of security settings of a field device to another field device. In such case, a security function is implemented: Only when the operator has an administrator authorization is the security setting export permitted. If the operator has a lesser authorization, or the operator cannot authenticate, because, for example, an incorrect identification is entered, since, for example, the operator has no account in the field device, then an export is not possible.

As an additional security factor, the exported security settings are encrypted, such that they cannot be read-out in cleartext.

The method of the invention is usable independently of the field device type of the first field device and the field device type of the second field device. The two field devices can thus also be mutually differing field device types.

Field devices, which can be used in connection with the invention, have already been named by way of example in the introductory part of the description.

In an advantageous embodiment of the method of the invention, it is provided that, in the course of the encrypting, the operator inputs a first password, or a first code, wherein the at least one security setting present in cleartext is encrypted by means of the first password, or code, wherein, in the course of the decrypting, the operator inputs the first password, or the first code, and wherein a successful decrypting only occurs upon correct input of the first password, or the first code.

In an alternative advantageous embodiment of the method of the invention, it is provided that, in the course of the encrypting, a random number of predetermined length is generated, wherein the security setting present in cleartext is encrypted by means of the first password, or the first code, and supplementally by means of the random number, wherein the random number is joined with the encrypted security setting and wherein the random number is used supplementally to the first password, or the first code, for decrypting.

In a first variant of the method of the invention, it is provided that used as service unit is a mobile service unit. The mobile service unit is, for example, a service unit in the sense of the Field Xpert tablet sold by the applicant. However, it can also be a PC, a laptop, a mobile end device, such as, for example, a smart phone or some other tablet, or a wearable device, such as, for example, a smartwatch or a smartglasses.

In an advantageous embodiment of the first variant of the method of the invention, it is provided that the encrypted security setting is exported to the service unit, and wherein the encrypted security setting is imported by the second field device from the service unit. The service unit can for this communicate by wire with the first, and the second, field devices, or alternatively establish a wireless communication with the first, and the second, field devices according to one of the customary standards, for example, Bluetooth or WiFi.

In a second variant of the method of the invention, it is provided that used as service unit is a service unit integrated in the first field device, or securely connected therewith. In such case, this is, for example, a device interaction means, which comprises one or more key-, or switch, elements and a display unit for display of information. Alternatively, the service unit is a touch screen, which is embodied both for input of service commands and, for example, passwords, and also for display of information.

In an advantageous embodiment of the second variant of the method of the invention, it is provided that the encrypted security setting is exported to an external storage medium, and wherein the encrypted security setting is imported by the second field device from the external storage medium. In such case, the first and second field devices have corresponding interfaces. The external storage medium is, for example, a USB stick flash memory, an external hard drive, an SD-card or the like.

In an advantageous embodiment of the method of the invention, it is provided that the identifying and authenticating is performed by means of input of an operator identification and a second password, or a second code. The input occurs then via the service unit. Instead of the password, it can also be provided that a biometric feature of the operator, for example, a finger print or the like, is required for authenticating.

In an advantageous embodiment of the second variant of the method of the invention, it is provided that the identifying and authenticating is performed by means of the service unit through exchange of a cryptographic key pair between the service unit and the first field device. Additionally, identification information can be transmitted from the service unit to the first field device. Only when corresponding identification information is stored in the field device is the identification successful. The identification information can be stored earlier in the security settings.

As regards the automation engineering field device, it is provided that such is embodied for use in the method of the invention. The field device obtains for this a software-, or firmware, update, in order that the corresponding method steps (exporting and encrypting) can be performed.

As regards the service unit, it is provided that such is embodied for use in the method of the invention. Executed in the service unit, in such case, is a suitable program, which allows performing of method steps relevant for the service unit.

BRIEF DESCRIPTION OF THE DRAWINGS

The invention will now be explained in greater detail based on the appended drawing. The figures of the drawing show as follows.

DETAILED DESCRIPTION

Figure 1:
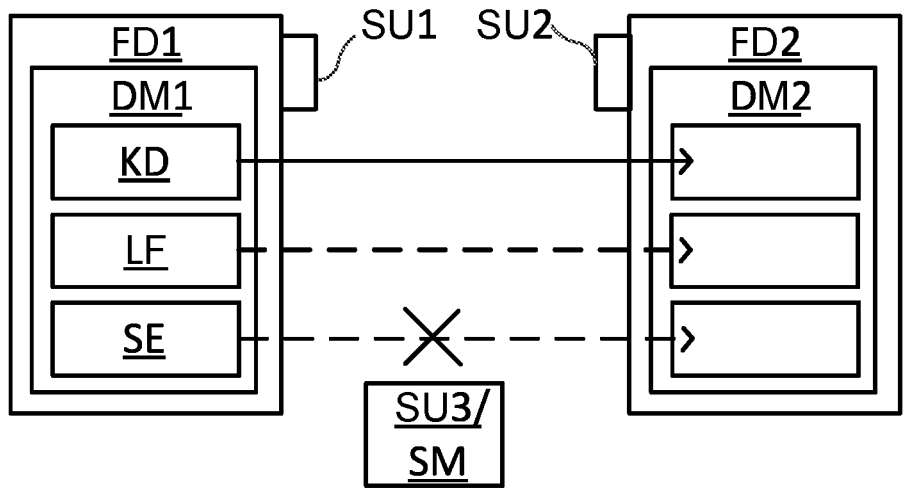
FIG. 1 shows an example of an embodiment of the method of the present disclosure.

FIG. 1 shows an example of an embodiment of the method of the invention. In such case, two field devices FD1, FD2 are shown. Besides components, which are provided for the intended operation of the field devices FD1, FD2, for example, thus, sensors, or actuators, and an operating electronics, whereby field devices FD1, FD2 are embodied for registering, or influencing, a physical variable of a process, in which a product is made from a raw or starting material by the application of chemical, physical or biological procedures, the two field devices have each a data memory DM1, DM2 provided for storing configuration data KD, or parametering data, log files LF, or log data, and security settings SE.

Additionally, each of the field devices FD1, FD2 can have a service unit SU1, SU2, via which the field device can be directly serviced at the device.

The configuration data KD can be easily exported from a field device FD1 and transmitted to another field device FD2, for example, via an external service unit SU3, or an external storage medium SM.

Figure 2:
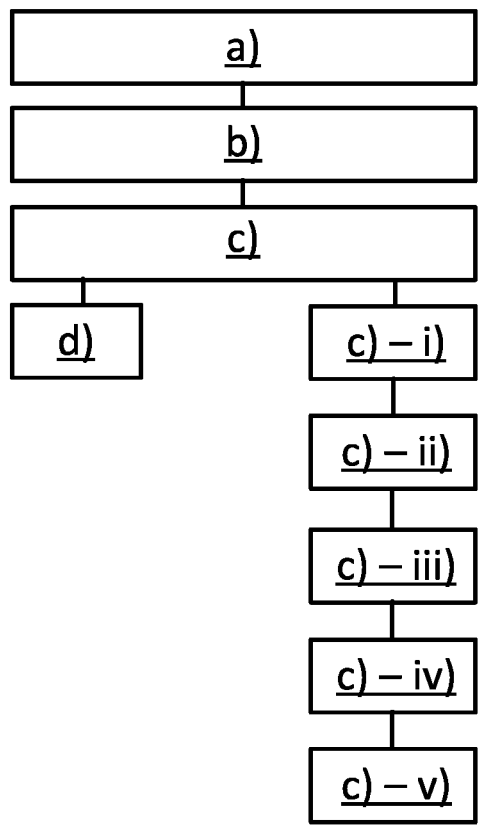
FIG. 2 shows a flow diagram illustrating method steps of the present disclosure.

Security settings SE are different, since this type of data is sensitive, or critical, for the plant. Thus, security settings SE can only be exported from a field device FD1 by an authorized operator as encrypted data and transmitted to one or more other field devices FD2. FIG. 2 shows a flow diagram illustrating the method steps required for this:

In a first method step a) an operator identifies itself relative to the field device FD1 by means of a service unit SU1, SU3. In such case, the operator enters, for example, an operator name into the service unit SU1, SU3. The service unit SU1, SU3 can be a mobile service unit SU3. A mobile service unit is, for example, a service unit SU3, for example, a Field Xpert tablet sold by the applicant. However, it can also be a PC, a laptop, a mobile end device, such as, for example, a smart phone or some other tablet, or a wearable, such as, for example, a smartwatch or a smartglasses.

Alternatively, the service unit SU1, SU3 is the service unit SU1 integrated in the first field device FD1, or securely connected therewith.

The identifying step c) detects which operator it is. The operator obtains access, however, only when authentication is achieved. Such is performed, for example, by correct input of a password or by collecting biometric features of the operator, for example, a finger print.

In the case, in which a mobile service unit SU3 is used, the identifying and authenticating can alternatively or supplementally also be performed by exchange of a cryptographic key pair between the service unit SU3 and the first field device FD1.

In the case, in which the operator successfully identifies and authenticates, then, in method step b), the operator is assigned an authorization group. An authorization group allows the operator access to at least one operational functionality (for example, a parametering procedure) and/or data record of the field device FD1. There exist a plurality of authorization groups, which differ in number and form of the defined operational functionalities. There is, in such case, an administrator authorization group provided, which allows an operator—besides other functions—access to the security settings SE of the field device FD1.

In the following method step c), it is checked whether the operator has been assigned the administrator authorization group. If such is not the case, then the operator has no access to the security settings SE and cannot execute subsequent method steps. The method is terminated in step d).

If the operator has been assigned the administrator authorization group, then the method is continued with method step c-i). In this step, the operator selects, by means of the service unit SU1, SU3, one or more security settings SE to be exported. In the field device, the security settings SE are present in cleartext. In order that unauthorized persons cannot intercept and copy these security settings SE, they are encrypted before being exported by the field device FD1. For this, the operator is asked to input a first password, or first code. The code, or password, serves, in such case, as key, which is hashed with the security settings SE. Additionally, also a random number of predetermined length can be generated, which is hashed with the first code, or password. The random number is, in such case, joined with the encrypted security setting SE and later exported with it and used for the later decrypting.

In method step c-ii), the encrypted security settings SE are exported. The format, with which the security settings SE are encrypted, is not important; it can, in principle, be any suitable file format. The exact export procedure differs, in such case, corresponding to the type of service unit SU1, SU3 used:

If the service unit SU1 is connected with the field device FD1 or integrated therewith, then the security settings can be exported in an external storage medium, for example, an SD-card or a USB stick flash memory. The field device FD1 has corresponding interfaces for this.

In the case, in which the service unit SU3 is a mobile service unit, the encrypted security settings SE can be directly transmitted to such.

In method step c-iii), the encrypted security settings SE are imported by the second field device FD2. The import procedure differs also, in such case, corresponding to the service unit SU1, SU3 used.

In method step c-iv), the encrypted security settings SE are decrypted. For this, the operator inputs the code used for the encrypting. Only when this is correctly input can the security settings SE be decrypted.

In the final method step c-v), the now decrypted security settings SE are written into the data memory DM2 of the second field device FD2. The second field device FD2 can then be operated with the loaded security settings SE of the first field device FD1.

The invention claimed is:

1. A method for transmitting security settings between a first automation engineering field device and a second automation engineering field device, wherein the first field device and the second field device each have a data memory in which the security settings are stored, wherein the security settings include an operator role management means having a plurality of authorization groups, wherein an authorization group allows an operator to access an operational functionality and/or a data record of the respective field device, wherein the authorization groups differ in number and form of the operational functionalities defined in the authorization groups, wherein an administrator authorization group is provided that allows access to the security settings of the first field device and of the second field device, the method comprising:

identifying and authenticating an operator via a service unit;

assigning an authorization group based on the step of identifying and authenticating the operator;

in a case in which the operator is assigned the administrator authorization group:

encrypting a security setting which is present in cleartext, by the first field device, and including the plurality of authorization groups;

exporting the encrypted security setting;

importing the encrypted security setting into the second field device;

decrypting the encrypted security setting;

loading the decrypted security setting into the data memory of the second field device and operating the second field device with the loaded security setting of the first field device.

2. The method as claimed in claim 1, wherein, in a course of the encrypting, the operator inputs a first password, or a first code, wherein the security setting present in cleartext is encrypted by means of the first password, or the first code, wherein, in the course of the decrypting, the operator inputs the first password, or the first code, and wherein a successful decrypting occurs only upon correct input of the first password, or the first code.

3. The method as claimed in claim 2, wherein the identifying and authenticating is performed by means of input of an operator identification and a second password, or a second code.

4. The method as claimed in claim 1, wherein, in a course of the encrypting, a random number of predetermined length is generated, wherein the security setting present in cleartext is encrypted by means of the first password, or the first code, and supplementally by means of the random number, wherein the random number is joined with the encrypted security setting and wherein the random number is used supplementally to the first password, or the first code, for decrypting.

5. The method as claimed in claim 1, wherein a mobile service unit is used as the service unit.

6. The method as claimed in claim 5, wherein the encrypted security setting is exported to the service unit, and wherein the encrypted security setting is imported by the second field device from the service unit.

7. The method as claimed in claim 6, wherein the identifying and authenticating is performed by means of the service unit through exchange of a cryptographic key pair between the service unit and the first field device.

8. The method as claimed in claim 1, wherein a service unit integrated in the first field device or securely connected therewith is used as the service unit.

9. The method as claimed in claim 8, wherein the encrypted security setting is exported to an external storage medium, and wherein the encrypted security setting is imported by the second field device from the external storage medium.

10. A tangible service device embodied for use in a method as claimed in claim 1.

11. The tangible service device of claim 10 including at least one of a key, a switch, a touchscreen, a tablet, a PC, a mobile end device, or a wearable device.

12. The method of claim 1 wherein the first automation engineering field device and the second automation engineering field device are mutually exclusive field device types.

13. An automation engineering field device, comprising:
a data memory in which security settings are stored, wherein the security settings include at least one operator role management means having a plurality of authorization groups, wherein an authorization group allows an operator to access at least one operational functionality and/or data record of the field device, wherein the authorization groups differ in number and form of the operational functionalities defined in the authorization groups, wherein an administrator authorization group is provided that allows access to the security settings of the field device,
wherein the field device is embodied to:
determine if the operator is assigned the administrator authorization group;
in the case in which the operator is assigned the administrator authorization group:
encrypt a security setting which is present in cleartext, and including the plurality of authorization groups;
export the encrypted security setting;
import the encrypted security setting;
decrypt the encrypted security setting;
load the decrypted security setting into the data memory of the field device and operate the field device with the loaded security setting.

\* \* \* \* \*